United States Patent
Krieger et al.

(10) Patent No.: US 7,886,173 B2
(45) Date of Patent: Feb. 8, 2011

(54) TRANSITIONING COMPUTING DEVICES FROM SECONDARY POWER TO PRIMARY POWER AFTER CORRESPONDING, INDEPENDENT DELAY TIMES

(75) Inventors: Ken Krieger, Jackson, WY (US); Albert Borchers, Santa Cruz, CA (US)

(73) Assignee: Exaflop LLC, Mountain View, CA (US)

( * ) Notice: Subject to any disclaimer, the term of this patent is extended or adjusted under 35 U.S.C. 154(b) by 884 days.

(21) Appl. No.: 11/546,467

(22) Filed: Oct. 10, 2006

(65) Prior Publication Data

US 2007/0278860 A1    Dec. 6, 2007

Related U.S. Application Data

(60) Provisional application No. 60/810,449, filed on Jun. 1, 2006.

(51) Int. Cl.
G06F 1/00    (2006.01)
(52) U.S. Cl. .......................................... 713/330; 714/14
(58) Field of Classification Search .................. 713/300, 713/330, 340; 714/14
See application file for complete search history.

(56) References Cited

U.S. PATENT DOCUMENTS

| | | | |
|---|---|---|---|
| 4,647,787 A * | 3/1987 | Pommer, II | ................. 379/413 |
| 5,119,014 A | 6/1992 | Kronberg | |
| 5,458,991 A | 10/1995 | Severinsky | |
| 5,579,522 A | 11/1996 | Christeson et al. | |
| 5,694,307 A | 12/1997 | Murugan | |
| 5,715,154 A * | 2/1998 | Rault | ........................... 363/89 |
| 5,844,884 A | 12/1998 | Szlenski | |
| 5,894,446 A * | 4/1999 | Itou | ........................... 365/222 |
| 6,429,706 B1 | 8/2002 | Amin et al. | |
| 6,768,222 B1 * | 7/2004 | Ricks | ......................... 307/32 |
| 6,824,362 B2 | 11/2004 | Dodson, III | |
| 6,935,130 B2 | 8/2005 | Cheng et al. | |
| 6,937,947 B2 | 8/2005 | Trembley | |
| 6,969,922 B2 | 11/2005 | Welches et al. | |
| 7,640,462 B2 * | 12/2009 | Lin | .......................... 714/701 |
| 2003/0133263 A1 | 7/2003 | Shu | |
| 2003/0197428 A1 | 10/2003 | Hatton et al. | |
| 2003/0237008 A1 * | 12/2003 | Freevol et al. | ............... 713/300 |
| 2004/0150374 A1 | 8/2004 | Kraus | |
| 2005/0012395 A1 | 1/2005 | Eckroad et al. | |
| 2005/0036248 A1 | 2/2005 | Klikic et al. | |
| 2005/0099750 A1 | 5/2005 | Takahashi et al. | |

(Continued)

OTHER PUBLICATIONS

PCT International Preliminary Report from corresponding PCT Application PCT/US2006/024880, mailed Mar. 19, 2009 (11 pages).

(Continued)

*Primary Examiner*—Chun Cao
(74) *Attorney, Agent, or Firm*—Fish & Richardson P.C.

(57) ABSTRACT

A method for powering a system is described. The method includes receiving a signal that indicates availability of a primary power source to supply operating power to a plurality of computing devices, and responsive to the received signal, transitioning each of the plurality of computing devices from a secondary power source to receiving power from the primary power source after a delay time that is a function of a substantially unique seed value for each computing device.

31 Claims, 8 Drawing Sheets

U.S. PATENT DOCUMENTS

2005/0283343 A1* 12/2005 Cromer et al. .............. 702/189

OTHER PUBLICATIONS

'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an pk/3530, 3 pages.

'Intelligent Temperature Monitor and PWM Fan Controller' [online]. Analog Devices, 2003, [retrieved on Oct. 24, 2006]. Retrieved from the Internet: <URL: www.analog.com/UploadedFiles/Data_Sheets/ADM1030.pdf#xml=http://search.analog.com/search/pdfPainter. aspx?url=http://www.analog.com/UploadedFiles/Data_Sheets/ADM1030.pdf&fterm=lntelligent&fterm—Temperature &fterm=Intelligent Temperature&la=en>, 28 pages.

'LM64 - +− 1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.

'Low-cost fan manager for power-supply applications' [online]. Electronic Design, 2006, [retrieved on Oct. 23, 2006]. <URL: www.elecdesign.com/Articles/Index.cfm?ArticIeID=6281>, 3 pages.

System Management Interface Forum, "PMBus Power System Management Protocol Specification Part 1—General Requirements, Transport and Electrical Interface, Revision I.0" Mar. 2005, 17 pages.

'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spi2/spi2r20b.pdf>, pp. 181-182.

PCT International Search Report and Written Opinion from corresponding PCT Application PCT/US2006/024880, mailed Feb. 15, 2008 (14 pages.).

Notification of the First Office Action from The State Intellectual Property Office of the People's Republic of China (16 pages), mailed May 12, 2010, for related Chinese application 200680055429.4.

Chonghui Li, "Application of Automatic Changeover Switch in UPS Power Supply System" Financial Computing in China, Issue $3^{rd}$, 2005, pp. 69-70.

"Distributed Monitoring System of Communication Power Supply" Siwel GU, China Master Theses Full-Text Database, Information Technology Series, Issue $3^{rd}$, 2003, pp. 7-8.

English translation of Chonghui Li, "Application of Automatic Transfer Switch in UPS Power Supply System" Financial Computing in China, Issue $3^{rd}$, 2005, pp. 69-70.

English translation of "Distributed Monitoring System of Communication Power Source" Siwel GU, China Master Theses Full-Text Database, Information Technology Series, Issue $3^{rd}$, 2003, pp. 7-8.

* cited by examiner

TRANSITIONING COMPUTING DEVICES FROM SECONDARY POWER TO PRIMARY POWER AFTER CORRESPONDING, INDEPENDENT DELAY TIMES

CROSS REFERENCE TO RELATED CASES

This application claims the benefit of U.S. Provisional Patent Application No. 60/810,449, filed Jun. 1, 2006, and entitled "Data Center Uninterruptible Power Distribution Architecture," the entirety of which is incorporated herein by reference.

TECHNICAL FIELD

The following disclosure relates to a power distribution architecture for data centers, for example, techniques and associated apparatus to efficiently deliver uninterruptible power to scalable and/or modular data processing equipment.

BACKGROUND

Computers have become widely adopted for various applications, for both personal and corporate uses. Some computers operate as stand-alone data processing equipment, with perhaps a peripheral such as a printer and a display device. Although useful for many purposes, additional features and benefits may be achieved if multiple computers are networked together to share information and resources.

A computer network may be formed by connecting two or more computing devices with an information channel. One type of network is a local area network (LAN). A typical residential LAN, for example, may connect two computers to a printer. A typical corporate LAN, for example, may allow many users to share resources and large amounts of information, including databases and application software.

A second type of network is a wide area network (WAN). A prime example of a WAN is the Internet. WANs such as the Internet allow many computer devices to communicate messages and share information. When multiple LANs are interoperable with one or more WANs, opportunities for computing devices to communicate and share information greatly expand.

From the perspective of an individual computing device that is connected to a network, users may direct the communication of information over a network with a user interface generated by a web browser application. A web browser is typically configured to enable the user to access web sites on the Internet or the World Wide Web. Web browsers allow users to easily send and receive messages over a network in packets of information. Such packets of information may include the address of a search engine website, such as www-.dogpile.com, for example.

The popularity and simplicity of sharing information over networks, such as the Internet, has resulted in demand for data processing and storage capacity to support high network traffic volume. One mechanism to address this need may be referred to as a data center. In the context of the Internet, a data center may provide processing, storage, and support functions that improve performance or enhance the utility of the Internet. Data centers may also be deployed in other contexts. Financial institutions, for example, may employ one or more data centers to store financial account and transaction information.

A data center may provide data processing and storage capacity. In operation, a data center may be connected to a network, and may receive and respond to various requests from the network to retrieve, process, and/or store data. In addition to extensive data processing and data storage capabilities, data centers typically support high speed data transfer and routing capabilities. To meet future network demands, data center capacity may continue to expand.

SUMMARY

The present specification relates to powering up power supplies.

In a first general aspect, a method for powering a system is described. The method includes receiving a signal that indicates availability of a primary power source to supply operating power to a plurality of computing devices, and responsive to the received signal, transitioning each of the plurality of computing devices from a secondary power source to receiving power from the primary power source after a delay time that is a function of a substantially unique seed value for each computing device.

In a second general aspect, a method for transitioning from a secondary power source to a primary power source is described. The method includes powering a plurality of systems with secondary power sources, where each system comprises at least one secondary power source that powers the system, detecting a primary power source, and transitioning from being powered by the at least one secondary power source to being powered by the primary power source. The transitioning is staggered so that a portion of the plurality of systems transitions at different times.

In another general aspect, a system is described. The system includes an interface for receiving a signal that indicates availability of a primary power source to supply operating power to a computing device, a data store to store a delay time that is a function of a substantially unique seed value for each computing device, and means for transitioning the computing device to receiving power from a secondary power source to receiving power from the primary power source after the stored delay time. The transitioning is initiated in response to the received signal.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
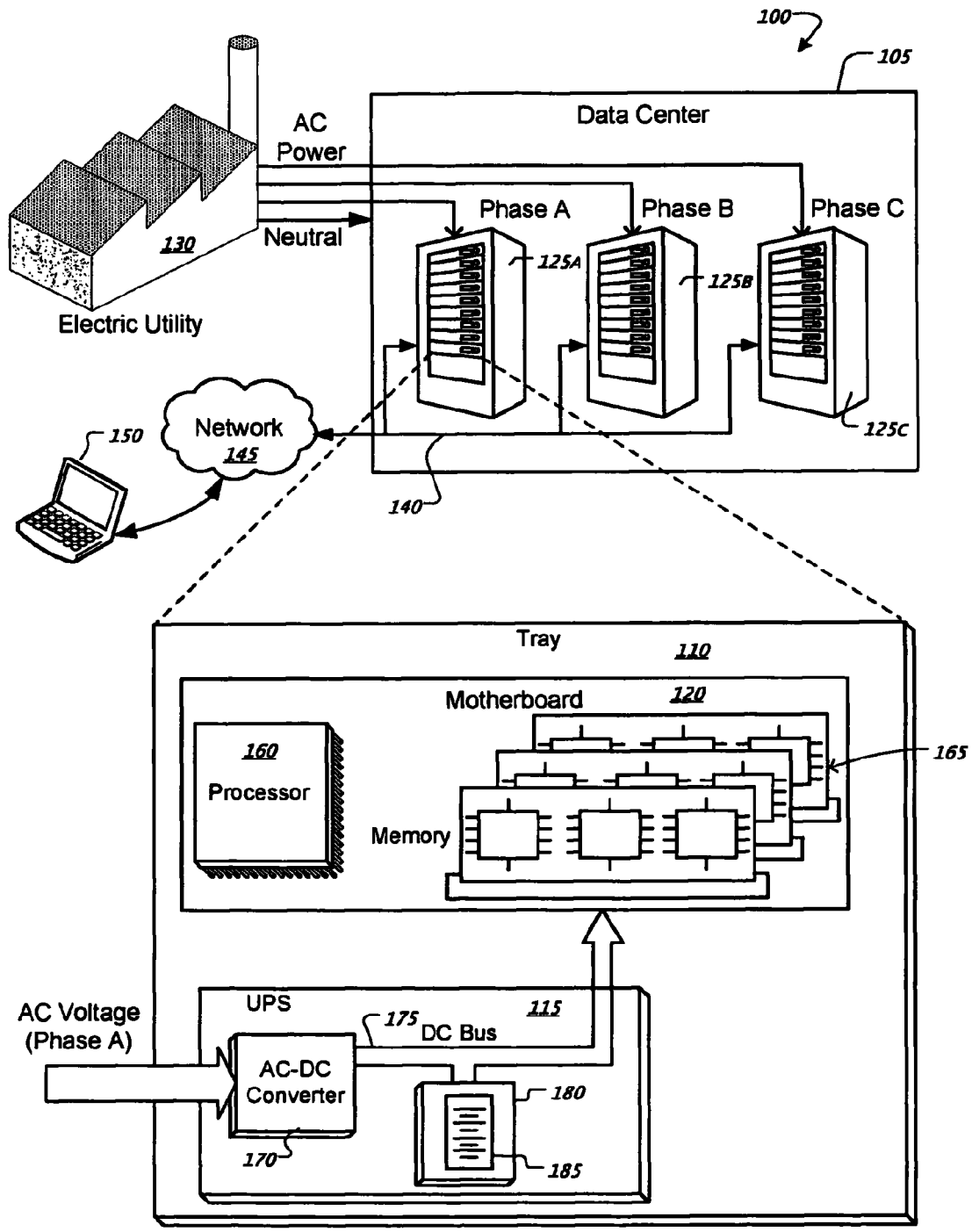
FIG. 1 is a schematic diagram illustrating an exemplary power distribution architecture for a data center in which each of a number of modular rack-mounted trays includes an uninterruptible power supply (UPS) integrated with a computer motherboard.

FIG. 1 is a schematic diagram illustrating an exemplary power distribution architecture 100 for a data center 105 in which each of a number of modular rack-mounted bases (which may also be referred to as trays) 110 includes an uninterruptible power supply (UPS) 115 integrated with a computer motherboard 120. Efficient power delivery may be achieved by configuring the UPS 115 to perform the only AC-to-DC rectification that occurs between the AC mains power received from the electric utility grid and the DC power consumed by the motherboard 120. In this example, AC mains refers to the AC power source available at the point of use in the data center 105. When received in the data center 105 at the UPS 115, the AC mains voltage is a substantially sinusoidal AC signal (e.g., 50 Hz, 60 Hz) that was generated, transmitted, and distributed by the electric utility. The AC mains input voltage is converted to a single DC voltage on a DC bus that delivers operating power to the motherboard 120. In the event of a fault on the AC mains, a battery circuit is electrically connected across the DC bus to supply operating power to the motherboard 120.

In the depicted example, the data center 105 includes a number of racks 125A, 125B, 125C that contain a number of the trays 110. The racks 125A-125C may be powered by three phase AC power line voltages that are delivered to the data center 105 from an electric utility 130. The AC power line voltages delivered to each of the racks 125A-125C may originate from a rotating generator operated by the electric utility and driven by a steam or gas turbine, for example. The AC voltage signals, which are substantially sinusoidal, may be transmitted to a distribution point, such as a substation (not shown) in the utility grid, for example. The power line voltages (e.g., 480 V line-to-line) may be distributed from the substation to the data center 105. In the data center 105, individual phase voltages (e.g., 208 V line-to-neutral) are routed to the individual racks 125A-125C. Suitable AC-to-AC transformers (not shown) may be employed, as necessary, to deliver the AC power at a specified AC voltage. For example, step-down transformers may transform AC power from high voltage levels suitable for transmission to levels that can be substantially directly applied to the UPS 115. In some three phase configurations, for example, such transformers may make appropriate transformations between WYE and DELTA connections if required.

Unless otherwise indicated, references to AC voltages are understood to refer to substantially sinusoidal voltages, and voltage amplitudes are understood to refer to root mean square (r.m.s.) values. The utility 130 may deliver substantially symmetric three phase voltages suitable for powering substantially balanced three phase loads.

In the depicted example, one phase voltage and a neutral line are distributed to each rack 125. The racks 125 and trays 110 may be configured to form a substantially balanced load. In other embodiments, a similar distribution may be used if the data center 105 included additional (or fewer) racks 125. As an example, the exemplary tray 110 (shown in magnified detail) in the rack 125A receives a phase A voltage and the neutral line. Each of the trays 110 in the rack 125A receives the same AC input voltage signal, namely the Phase A-to-neutral voltage.

Similarly, each of the trays 110 in the rack 125B receives a Phase B-to-neutral as the AC input voltage signal, and each of the trays 110 in the rack 125C receives Phase C-to-neutral as the AC input voltage signal. In other implementations, different phase voltages may be distributed among the trays 110 in one of the racks 125A-125C, and/or the AC input voltage signal to each of the trays 110 may be line-to-line voltages instead of line-to-neutral voltages. In various embodiments, any practical number of phases (e.g., 1, 2, 3, 4, 5, 6, . . . 12 or more) may be distributed to provide operating power to individual trays 110.

Each of the trays 110 in the depicted example is coupled to a network connection 140. The network connection 140 provides an information channel to a network 145, which may include, for example, a local area network, virtual private network, wide area network (e.g., the Internet), or a combination of such networks, which may be wired, fiber optic, and/or wireless. A remote computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) may facilitate such communication. For example, the exemplary remote computer device 150 may be included in a server, a desktop computer, a laptop computer, and/or a handheld processor-based device. One or more servers may pre- or post-process, supervise, route, and/or balance the flow of data associated with the communication.

In various embodiments, the motherboard 120 may include one, two, three, four, or any other practicable number of processors 160. In some embodiments, the motherboard 120 may be replaced with tray of data storage devices (e.g., hard disc drives, flash memory, RAM, or any of these or other types of memory in combination). In such embodiments, the data storage devices, the UPS 115 with the battery 185 may be integrated with the data storage devices and supported on the tray 110. In other embodiments, the data storage devices, the UPS 115 with the battery 185 can be integrated with the motherboard 120. In various embodiments, a digital processor may include any combination of analog and/or digital logic circuits, which may be integrated or discrete, and may further include programmable and/or programmed devices that may execute instructions stored in a memory. The memory 165 may include volatile and/or non-volatile memory that may be read and/or written to by the processor 160. The motherboard 120 may further include some or all of a central processor unit(s) (CPU), memory (e.g., cache, non-volatile, flash), and/or disk drives, for example, along with various memories, chip sets, and associated support circuitry.

In some embodiments, the motherboard 120 may provide one or more DC-to-DC converters to convert the DC bus voltage to a suitable voltage for operating the circuitry in the motherboard 120. For example, one or more DC-to-DC converters may provide regulated output voltages, which may include but are not limited to, for example a +3.3VDC power signal, a +5VDC power signal, a −5VDC power signal, a +12VDC power signal, and a −12VDC power signal.

In an exemplary implementation, the processor 160 and the memory 165 on the motherboard 120 may form at least a part of a processing system configured to handle network operations. As an illustrative example, the motherboard 120 may help to process Internet requests. The motherboard may process information either alone or in combination with other parallel processes running on other processor-based devices, such as one or more other trays 110 in the data center 105.

An AC input voltage signal is delivered to each of the trays 10 to be processed by the UPS 115. In some examples, the AC input voltage signal may be received from the AC mains. The UPS 115 includes an AC-to-DC converter 170 that converts the AC input voltage signal to a regulated DC voltage. The converter 170 outputs the regulated DC voltage onto a DC bus 175. In some embodiments, the AC-to-DC converter 170 may regulate the DC voltage to a static set point. In some other embodiments, the set point may be dynamically determined.

In some of the static and dynamic embodiments, the set point may be based on a characteristic of the battery. Examples of such set point regulation will be described in additional detail with reference to FIG. 3.

The AC-to-DC converter 170 may maintain voltage regulation on the DC bus 175 when the AC input voltage signal is in a normal range. A normal range for a typical sinusoidal AC signal may be specified in various ways. For example, one or more thresholds may be specified between about 80 V and 500 V for line frequencies that may be between about 40 Hz and 1000 Hz, such as around 50 Hz, 60 Hz, 100 Hz, 200 Hz, 300 Hz, 400 Hz, 500 Hz, . . . , and up to about 1000 Hz or more. As an illustrative example, for a 120 V nominal (r.m.s.) AC input voltage signal, a fault may be identified if the r.m.s. voltage drops below a second threshold of 100 V for a predetermined amount of time. In other implementations, a fault may be identified based on peak voltage, for example, a fault can be sensed if the AC peak input voltage falls below a first threshold of 90 V in any half cycle. Fault conditions may include, without limitation, blackouts, brownouts, voltage sags, surges, instabilities related to switchgear operation, or other electrical transient associated with the AC mains. In some implementations, a fault condition may cause or potentially cause improper operation of a processing unit in the DC load, for example, if the AC-to-DC converter 170 is unable to maintain adequate regulation of the voltage on the DC bus 175, and/or to supply sufficient current to operate the DC loads serviced by the DC bus 175.

If the AC input voltage signal falls outside of a normal range, such as during a fault condition, a detection circuit (not shown) may send a signal indicative of this condition. In response to detecting the fault condition, a battery circuit 180 may be configured to connect a battery 185 across the DC bus 175 so that the motherboard 120 can continue to operate substantially without interruption. The battery 185 may continue to provide operating power to the circuits on the motherboard 115 until the battery 185 substantially discharges. The battery circuit 180 may include circuitry capable of controlling the charging and/or discharging the battery across the DC bus 175 in various operating modes. An exemplary battery circuit is described in further detail with reference to FIGS. 5A, 5B.

Figure 2:
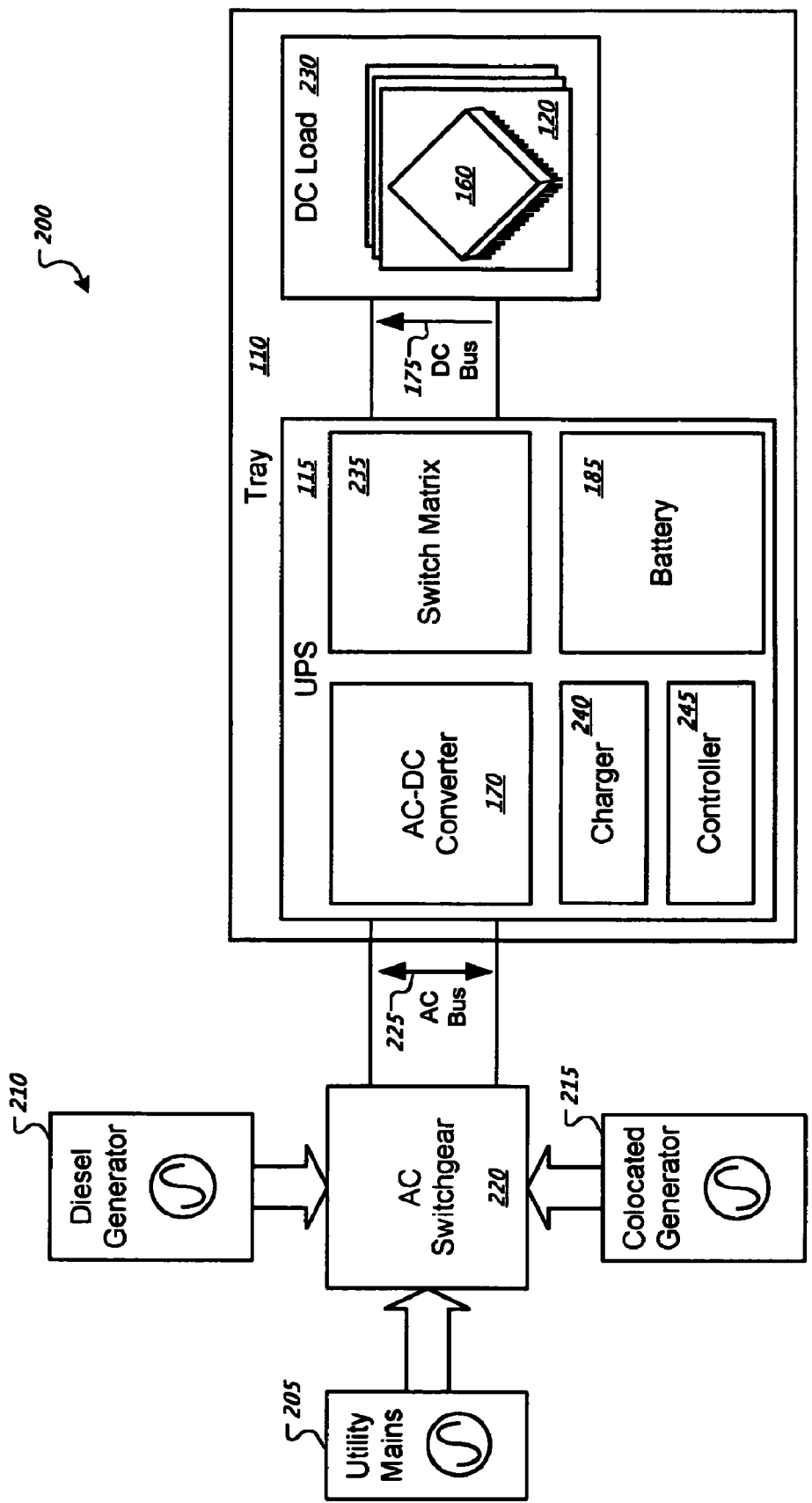
FIGS. 2-4 are block diagrams that illustrate exemplary power distribution architectures for delivering power to operate DC loads that have a processor.
Figure 3:
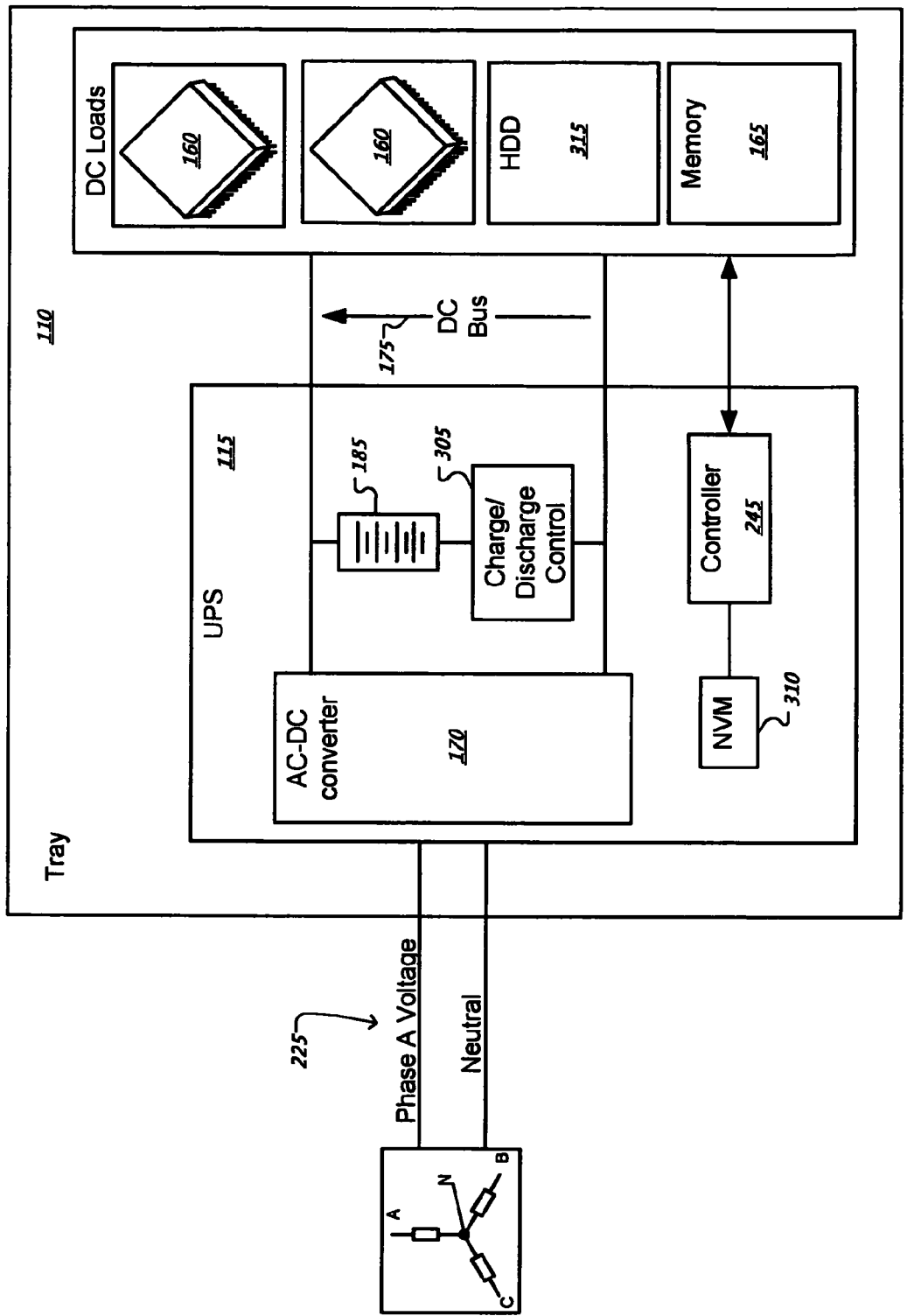
Figure 4:
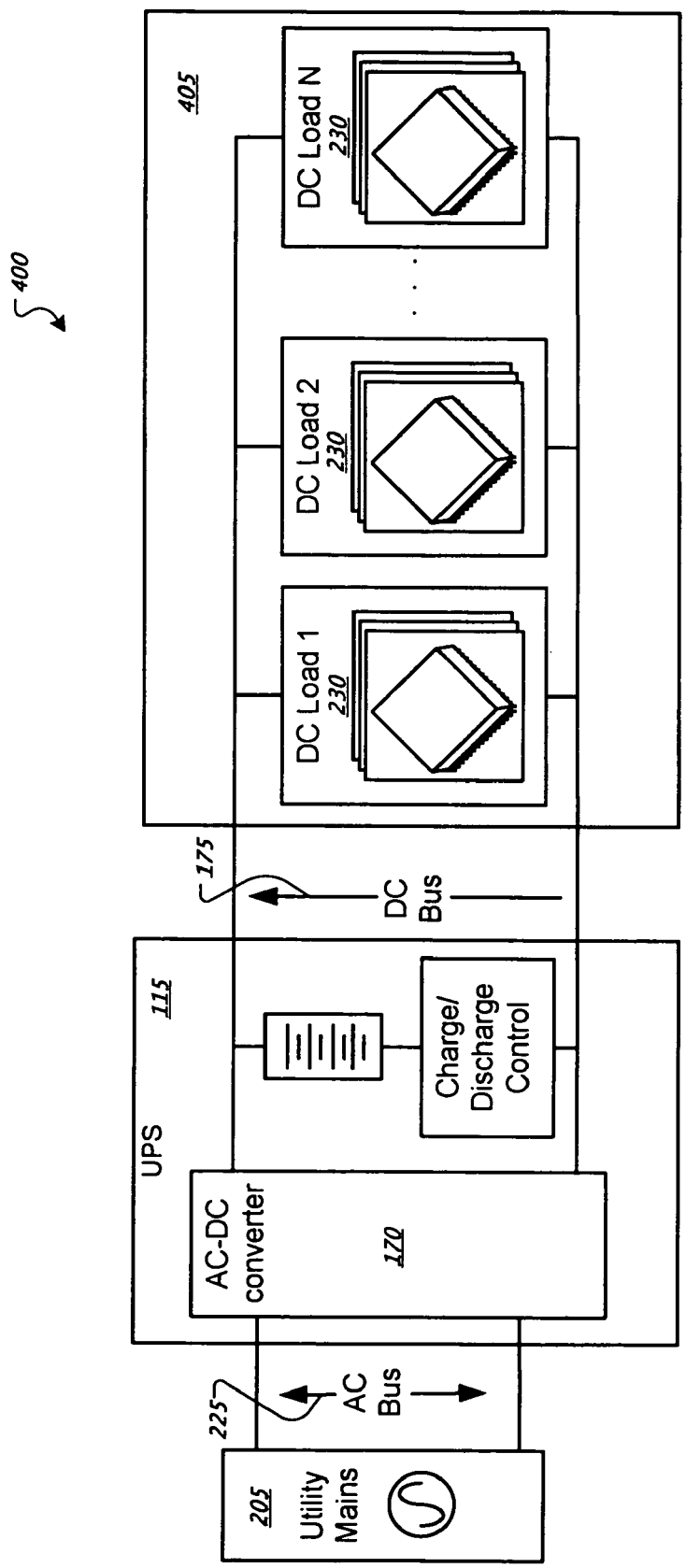

FIGS. 2-4 are block diagrams that illustrate exemplary power distribution architectures for delivering power to operate DC loads that have at least one processor. For example, the motherboard 120 may constitute a DC load in various embodiments. In these examples, the AC-to-DC converter 170 provides the only AC-to-DC rectification that occurs between the AC utility grid (e.g., substation transformer, transmission line, generator, and the like) and the microprocessor 160 in any of the trays 110.

FIG. 2 shows an exemplary power distribution architecture in a system 300, which may be implemented in a large facility with large power requirements, for example. The system 200 includes a utility AC mains generator 205 to supply AC mains voltage from a utility such as the electric utility 130. The exemplary system 200 also includes two back-up AC generators, including a diesel fuel powered generator 210 and a co-located (e.g., turbine) generator 215. Power from the generators 205, 210, 215 may be combined and/or selected by the AC switchgear 220, and then delivered to the tray 110 via an AC bus 225. In the event of a fault on the AC mains from the generator 205, the generators 210, 215 may provide a backup AC input voltage signal on the AC bus 225.

In some implementations, a substantially asynchronous energy source may be used to generate a substantially sinusoidal AC voltage signal. For example, a flywheel energy storage and recovery system may be used. Wind or solar generated energy, such as that provided by a wind farm or a solar farm, respectively, may serve as sources of energy to generate a substantially sinusoidal AC voltage in an electric utility grid. In such implementations, the generated substantially sinusoidal signal is transmitted through the utility grid to an input of the AC-to-DC converter 170 without intervening AC-to-DC rectification.

In cooperation with the battery backup provided by the battery 185, the generators 205, 210, 215 may provide substantially uninterruptible power to operate a DC load 230 on the tray 110 for short, intermediate, and/or longer term periods.

An exemplary use of the generators 210, 215, may be illustrated in the event of a fault (e.g., brownout, blackout) or unavailability (e.g., circuit maintenance) of the AC mains voltage from the generator 205. In response to detecting the fault on the AC input voltage signal, the battery 185 is connected to deliver substantially battery voltage across the DC bus 175. As such, short term (e.g., at least 10, 20, 30, 40, 50, 60 seconds at full load) operation of the DC load is maintained by power supplied from the battery 185. The diesel generator 210 may be started to provide power to the AC bus 225, preferably before the battery 185 fully discharges. For more extended AC power faults, the co-located generator 215 may be brought on-line to provide a more cost-effective operation, or to avoid exceeding government-regulated limits on diesel fuel generation.

In some implementations, one or both of the generators 210, 215 may provide peak load shedding capability. For example, the co-located generator 215 may be used during expected peak demand hours each day. In some cases, this may permit negotiation of preferential rates for electric power from the electric utility 130.

FIG. 3 shows an exemplary schematic in additional detail. In various embodiments, the AC-to-DC converter 170 may regulate the single output voltage on the DC bus to a set point. The set point may be a static value in some embodiments, or it may be dynamically determined during operation. For example, the set point may be based, at least in part, on one or more electrical characteristics of the battery.

Characteristics on which a set point can be established may include battery characteristics such as battery chemistry, battery age, charge/discharge history, nominal maximum charge, temperature, charging profile (e.g., voltage charge rate under constant current), estimates of battery internal impedance, or other parameters relating to the electrical performance of the battery.

In addition to internal battery characteristics, the set point may be based at least in part on electrical circuit parameters of the battery circuit 180 and the DC bus 175. In some embodiments, the set point to which the AC-to-DC converter 170 regulates the voltage on the DC bus 175 can be a function of a battery charging circuit topology. If the battery charging circuit provides a voltage boost circuit (e.g., boost converter, charge pump, flyback), then the set point voltage may be substantially at or below a desired maximum charge voltage. If the battery charging circuit only provides a voltage step-down (e.g., linear regulator, buck converter) capability, then the set point can be set to a value sufficiently above the maximum nominal charge voltage to achieve the required charge performance over relevant temperatures, taking account of tradeoffs in power loss and charging current and corresponding charge time. In light of such trade-offs, the set point may be only as high as necessary to meet charge time specifications. For example, the set point may be set to between about 0.050 and about 1 Volt above the nominal expected battery voltage.

In certain embodiments, the battery (or battery strings) has a higher output voltage than the voltage that is supplied to a DC load, such as the motherboard 120. A step-down converter can be used to reduce the voltage output from the battery to the voltage required to supply the DC load. For example, the charge/discharge control 305 (shown in FIG. 5C) can include the step-down converter used to reduce the battery's voltage.

In other embodiments, the battery can have a lower output voltage than the voltage provided to the DC load. Here, the charge charge/discharge control 305 can include a step converter, such as a boost converter, used to increase the voltage from the battery so that it supplies adequate voltage to the DC load.

In various embodiments, the set point voltage may be set based on a specified temperature, such as 0, 10, 25, 30, 40, 50, . . . , 80 degrees Celsius. In an illustrative example, the set point may be dynamically adjusted based on a temperature in or around the battery 185 as measured by at least one temperature sensor (not shown).

In the depicted embodiment, the UPS 115 includes a charge/discharge control circuit 305 in series connection with the battery 185, and further includes the controller 245 in operative connection with a non-volatile memory (NVM) 310.

The series connected battery 185 and circuit 305 are connected across the DC bus 175. Responsive to a signal indicative of a fault on the AC input voltage signal, the circuit 305 can operatively connect the battery 185 across the DC bus 175 to permit the battery to discharge to the DC load 230 through a low impedance path. When the AC input voltage signal on the AC bus 225 is not faulted, the circuit 305 may selectively permit charging current to flow from the DC bus 175 to charge the battery 185.

In the depicted embodiment, the NVM 310 may store set point information for regulating the output of the AC-to-DC converter 170. The set point information may be stored during manufacturing time, upon first use, and/or dynamically updated during operation of the tray 110. The controller 245 and/or the AC-to-DC converter 170 may read and/or use the stored set point information to determine how to control the AC-to-DC converter 170. In addition to set point information, information about threshold conditions for switching over between AC input and battery operation may be stored in the NVM 310, for example.

In other implementations, the output of the AC-to-DC converter is not regulated; however, a step-up or step-down converter can be interposed between the AC-to-DC converter and the load to provide the load with an appropriate voltage. Additionally, the AC-to-DC converter can be used in combination with step-up or step-down converter to provide the load with an appropriate voltage.

Access to information stored in the NVM 310 may be provided through a serial or parallel interface (which may have a wired and/or unwired (e.g., infrared) physical layer), for example, between the NVM 310 and one or more processors 160 on the DC load 230. The processors 160 may be used to access and/or update information in the NVM 310 via the network connections 140 (FIG. 1) to each tray 110.

Additional data storage devices may be provided on the DC load 230. In the depicted example, the DC load 230 includes two processors 160 in operative connection with the memory 165 and a hard disc drive (HDD) 315.

FIG. 4 illustrates an exemplary power distribution architecture 400 on the rack 125. In the architecture 400, the UPS 115 delivers power through the DC bus 175 to multiple DC loads 230 in a processing unit 405. Each DC load 230 is connected in parallel across the DC bus 175. Power delivered to the DC loads 230 is rectified from AC-to-DC only one time between the utility mains 205 and the DC load 230. In one embodiment, a processing unit 405 includes an array of disks, an interconnect card, and an uninterruptible power supply with a battery.

In various implementations, each DC load 230 may have similar circuits or different circuits. Various ones of the DC loads may provide primarily data storage, data processing, data communication, or a combination of these or other functions. In one embodiment, the DC loads 230 are located on multiple trays in the rack 125. In another embodiment, the entire processing unit 405 is located on one of the trays 110. In some embodiments, the UPS 115 is integrated on a single tray 110 with the processing unit 110. In other embodiments, the UPS 115 may be located elsewhere on the rack 125. Processing unit 405 may refer to a one or more trays, racks, or other structure containing one or more DC loads 230, which structure may include at least one bay, cabinet, portable or stationary building, or an entire facility, such as the data center 105, for example.

Figure 5A:
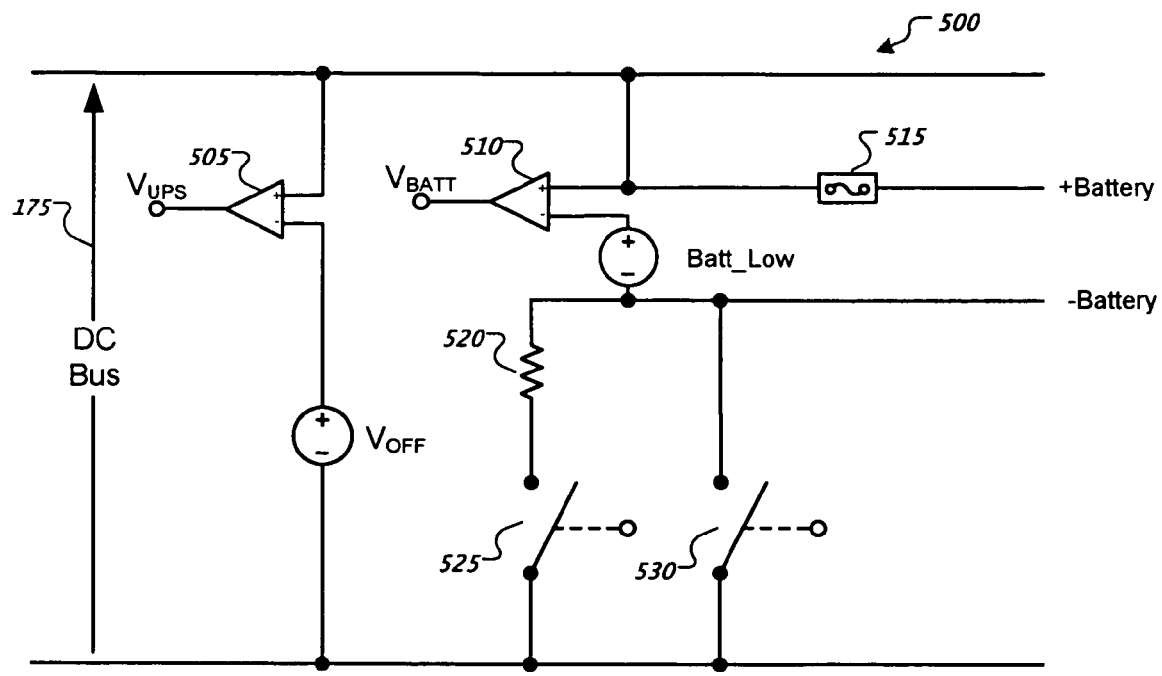
FIGS. 5A-5D are schematic diagrams showing details of a battery circuit in an exemplary power distribution architecture.
Figure 5B:
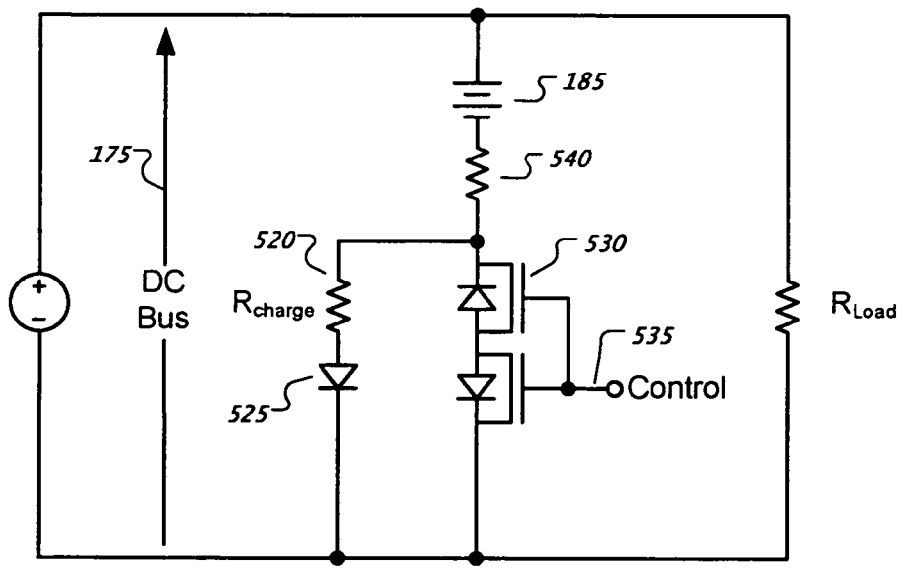

FIGS. 5A-5B are schematic diagrams showing details of a battery circuit in an exemplary power distribution architecture.

FIG. 5A shows an exemplary schematic 500 for a portion of the charge/discharge control circuit 305, which is described with reference to FIG. 3. The schematic 500 includes a comparator circuit 505 to control a signal Vups when the voltage on the DC bus 175 falls below a threshold, Voff. The schematic 500 also includes a comparator circuit 510 to control a signal VBatt when the voltage on the DC bus 175 falls below a threshold, Batt_Low. The signals Vups and Vbatt are described in additional detail with reference to FIGS. 6-7.

In other implementations, the circuit 510 acts as an operational amplifier (op amp) that measures voltages instead of a comparator that generates an output based on a comparison of the two input signals. The measured voltages can then be compared in software executed by the controller.

The schematic 500 further includes an over-current protection element 515, which in this example includes a fuse. One terminal of the fuse 515 connects to a positive terminal of the battery, and the other terminal connects to a positive rail of the DC bus 175. Alternatively, the fuse 515 can be coupled to the negative terminal of the battery. In yet other examples, additional series and/or shunt devices to provide over-current, over-voltage, reverse protection, EMI mitigation, and/or other functions.

In the depicted embodiment, a pair of terminals (+Battery, −Battery) is connectable to a battery. The negative battery terminal (−Battery), connects to two parallel paths, each of which is controllable by operation of a switch. One of the parallel paths connects the negative battery terminal to a negative rail of the DC bus 175 through a resistor 520 and a switch 525. This path permits a charging current to flow when the switch is closed. The amplitude of the charging current is substantially limited by the value of the resistance 520 and the difference between the voltage on the DC bus 175 and the battery (not shown). The internal resistance of the battery is typically much less than the value of the resistance 520. In some applications, the voltage drop across the resistance 520 may be used to measure and/or control the charging current.

The other parallel path connects the negative battery terminal to a negative rail of the DC bus 175 through a switch 530. When the switch 530 is closed, the battery is operatively connected across the DC bus 175. In this state, the battery can discharge and supply operating power to any DC loads (not shown) that are also connected across the DC bus 175.

The switches 525, 530 may be passively and/or actively controlled. An exemplary embodiment, shown in FIG. 5B, is illustrative of one implementation, and is not to be taken as limiting.

In FIG. 5B, the battery 185 is modeled with a series resistance 540 that may represent internal and/or contact resistance, for example. The ideal switch 525 (FIG. 5A) for charging the battery is implemented as a diode with no active control input. In this implementation, the AC-to-DC converter 170 (not shown) may regulate the DC bus 175 to a voltage that is sufficient to forward bias the diode (switch) 525 over temperatures of interest and to provide a desired charging current. As such, the set point may be at least the maximum charging voltage plus a diode drop voltage. In some implementations, the diode is optional. For example, the diode can be replaced by a switch, if it is assumed that the supply voltage will be higher than the battery voltage.

In the depicted example of FIG. 5B, the battery charging current is determined, at least in part, by a series resistance and a unidirectional current mechanism, such as a diode or other semiconductor switch, for example. In other embodiments, the battery charger may include a series-pass regulator (e.g., low drop out (LDO) linear regulator) or a switch mode power converter (e.g., buck, boost, buck-boost, Cepic, Cuk, flyback, charge pump, or resonant, etc.), either alone or in combination. The battery charge current may be controlled by current mirror techniques, or using current measurement feedback techniques involving current sense resistance or inductive coupling measurement, for example.

The ideal switch 530 (FIG. 5A) for discharging the battery is implemented as a back-to-back MOSFET (metal oxide semiconductor field effect transistor) switch configured to block current in both directions when in a non-conductive state. This switch 530 opens and closes in response to a control signal 535 that may be generated, for example, by the controller 245 (FIG. 3), for example. In various embodiments, the switches 525, 530 may include Schottky diodes, insulated gate bipolar transistors (IGBTs), or other semiconductor or electromechanical switches (e.g., relays). In other embodiments, discharging the battery is implemented using a step-down regulator, such as a buck converter.

Figure 5C:
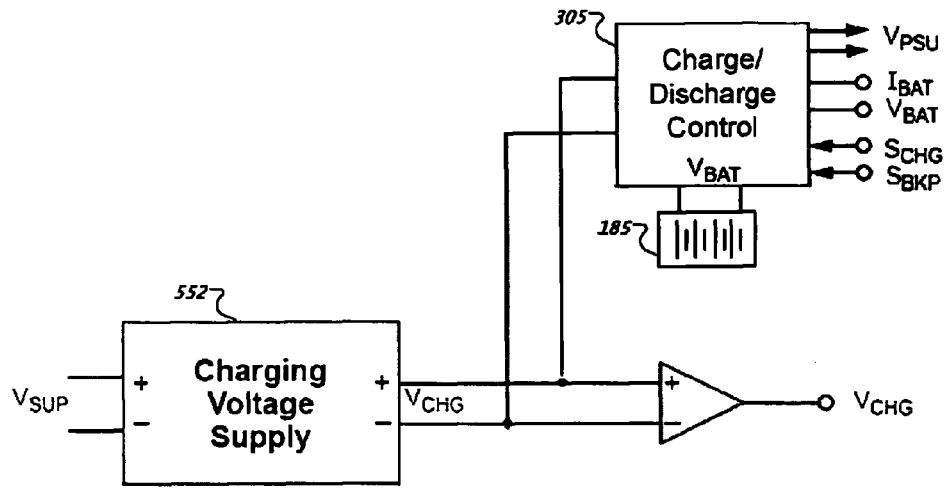

FIG. 5C shows an exemplary schematic 550 for a battery charge/discharge control topology. The schematic 550 includes a charging voltage supply that is separate from the power supply used to power a load, such as the motherboard 120. The charging voltage can be used to charge the battery 185 (e.g., instead of, or in addition to, the power supply used to power the load), which can optionally be connected to the power supply's output during battery operation.

Figure 5D:
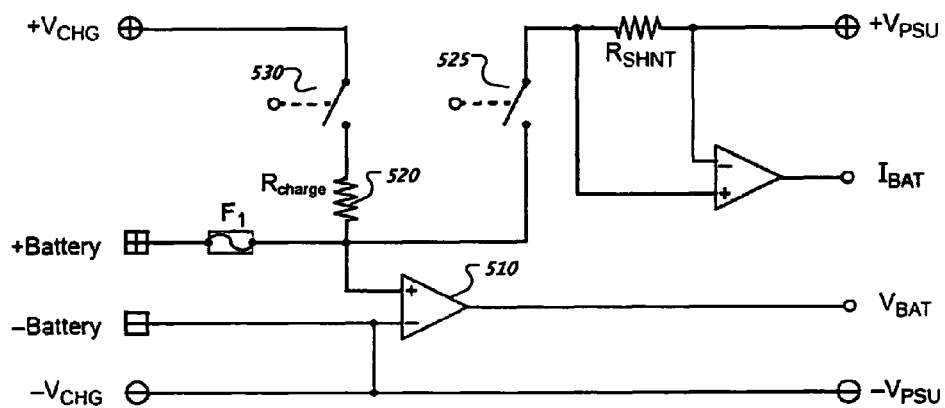

FIG. 5D shows an alternative exemplary schematic 580 for the battery charge/discharge control. One of the differences between the schematic 580 and the schematic 500 is that in the schematic 580 the $-/+V_{CHG}$ is received from the charging voltage supply 552 instead of directly from the AC-DC converter 170.

Figure 6:
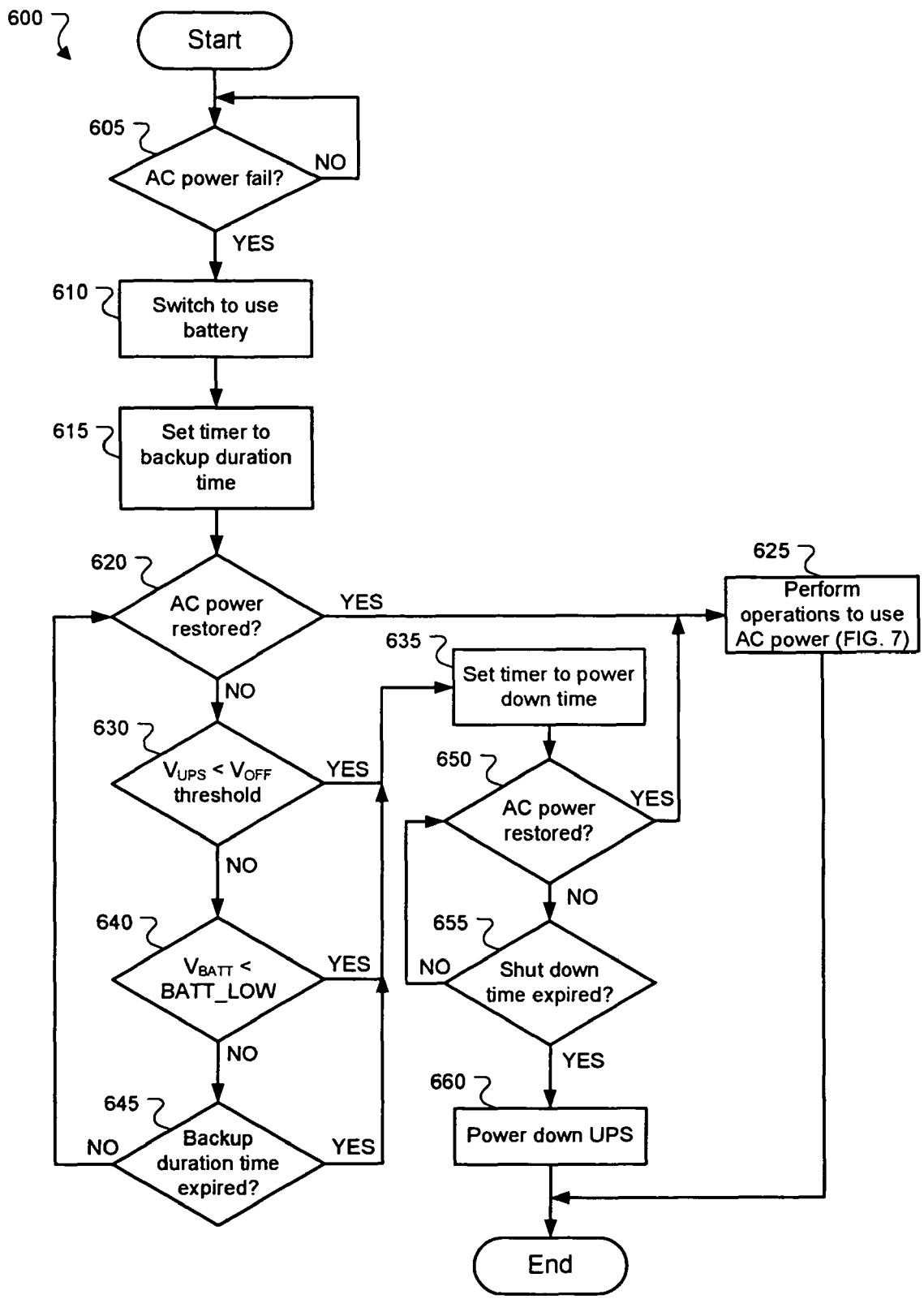
FIGS. 6-7 are flow diagrams illustrating exemplary methods that may be performed in embodiments of the power distribution architecture.
Figure 7:
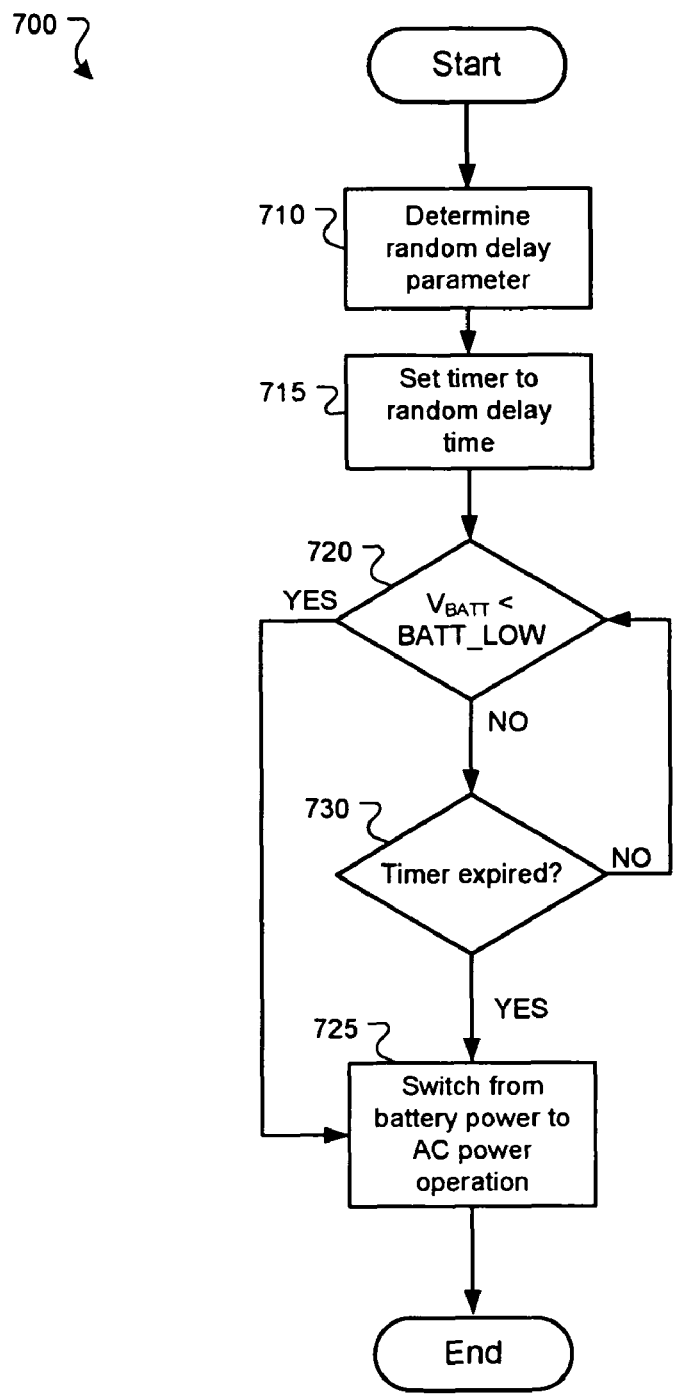

FIGS. 6-7 are flow diagrams illustrating exemplary methods that may be performed in embodiments of the power distribution architecture.

Referring to FIG. 6, a flowchart 600 illustrates an exemplary method that the UPS 115 may perform to handle a fault condition on the AC input voltage signal. In some embodiments, the UPS 115 may perform the method to coordinate switchover to and/or from the battery as a temporary power source. In some cases, performing the method may substantially reduce and/or prevent performance disruptions (e.g., data errors) as a consequence of the AC fault condition. For example, the battery 185 may provide sufficient operating power to maintain operation of the DC loads 230 until an AC source, such as the utility mains 205 or backup generators 210, 215, can be brought on-line. In some embodiments, the battery 185 may continue to provide operating power while the DC loads 230 execute instructions to perform graceful power-down operations. Such graceful shutdown operations can vary widely, but generally attempt to mitigate performance disruptions that could result from the fault condition. Such disruptions may, for example, manifest themselves as stale or corrupted data when the processing system is subsequently restarted.

Generally, the method includes operations that may be performed by a controller (e.g., the controller 245). The operations may further be performed under the control, supervision, and/or monitoring of one or more of the processors 160 in the system 100. Operations may also be supplemented or augmented by other processing and/or control elements that may be in operative communication with the controller through a network connection 140 coupled to the tray 110. Some or all of the operations may be performed by one or more processors executing instructions tangibly embodied in a signal. The processing may be implemented using analog and/or digital hardware or techniques, either alone or in cooperation with one or more processors executing instructions.

The method begins at step 605 when the controller determines that there is a fault on the AC input voltage signal. For example, the controller may identify the occurrence of AC power failures by monitoring, for example, the AC bus 225, a voltage status condition signal provided by a voltage monitoring/fault detection circuit on the tray 100, and/or an output voltage (e.g., $V_{UPS}$ in FIG. 5A) at the DC bus 175. In some embodiments, the UPS 115 may include an analog to digital converter that converts $V_{UPS}$ into a digital value (e.g., a 10 bit digital value). When the controller detects that a key voltage drops below a threshold, the controller may initiate an AC power fault routine. In other embodiments, the controller may receive signals from an external component, such as a power combiner in the AC switchgear 220. Such signals may indicate a failure in the AC input voltage signal. In other embodiments, the AC-to-DC converter 170 may send a message to the controller to indicate an AC power fault.

If the controller determines that the AC power is not faulted, then step 605 is repeated. If the controller determines that the AC power is in a fault condition, then, in step 610, the controller switches the UPS 115 from AC operation to battery operation. For example, the controller may send signals to open the switch 525 and to close the switch 530 (FIG. 5A) to operatively connect the battery 185 across the DC bus 175 such that the battery 185 can support the DC loads 230. In some implementations, the battery is not directly connected to the DC loads 230. For example, a step-down converter, such as a buck converter can be interposed between the battery 185 and the DC bus 175 so that when the switch 530 is closed, the voltage is reduced before it is supplied to the DC loads 230.

Next, in step 615, the controller sets a timer to a backup duration time. The timer may be a register in the controller which is decremented or incremented as time advances. In some embodiments, the backup duration time may represent a duration that the battery power may be used or relied upon. For example, the controller may compute the backup duration time using an estimate of an expected battery life, less the time required for the DC loads 230 to perform graceful power down operations.

In other embodiments, the controller may load the backup duration time from the NVM 310. In step 620, the controller determines whether the AC power is restored. For example, the controller may receive a message from the AC-to-DC converter about the present status of the AC input power. As another example, the controller may poll the AC-to-DC converter to determine whether the AC power is restored. If the controller determines that the AC power is restored, then the controller may perform operations in step 625 to switch back to operating from AC power, and the method 600 then ends. An exemplary method for switching from battery power to AC power is described in further detail with reference to FIG. 7.

If, at step 620, the controller determines that the AC power is not restored, then in step 630 the controller checks whether $V_{UPS}$ is less than a minimum voltage for battery backup ($V_{OFF}$). If the controller determines that $V_{UPS}$ is less than $V_{OFF}$, then the controller may set the timer to a power down time in step 630. For example, the power down time may be an estimation of the time required for the DC loads to perform the power down operations. In some examples, the power down operations of the DC loads may prevent data loss and/or avoid damage due to sudden loss of DC power. If, in step 630, the controller determines that $V_{UPS}$ is not less than $V_{OFF}$, then, in step 640, the controller may determine whether an output voltage of the battery ($V_{BATT}$) is less than a battery low threshold (BATT_LOW). In some embodiments, when $V_{BATT}$ is lower than BATT_LOW, it may indicate that the power stored in the battery is low and proper power down operations may be executed to prevent data loss, for example. If the controller determines that $V_{BATT}$ is less than BATT_LOW, then the step 635 is performed. If the controller determines that $V_{BATT}$ is not less than BATT_LOW, then the controller may check whether the backup duration time is expired. If the controller determines that the backup duration time is expired, then the step 635 is performed. If the controller determines that the backup duration time is not expired, then the step 620 is repeated.

Additionally, in certain embodiments, a host is notified if $V_{BATT}$ is less than BATT_LOW. The host may then initiate operations, such as reducing the operating load of the processor 160 or initiating a power-down process for the tray 110. This may be in addition or in place of shortening back-up duration time by moving from the step 640 to the step 635 in FIG. 6.

After the controller sets the timer to the power down time in step 635, the controller may check whether the AC power is restored in step 650. If the controller determines that the AC power is restored, then the step 625 is performed. If the controller determines that the AC power is not restored, then the controller determines whether the power down time is expired in step 655. If the controller determines that the power down time is not expired, then the step 650 is repeated. If the controller determines that the power down time is expired, then the controller may, in step 660, power down the UPS (e.g., open the switch 530 in FIG. 5) and the method ends.

FIG. 7 shows a flow chart that illustrates an exemplary method 700 of operations for switching from battery backup power to AC input power. For example, a controller may switch from battery operation to AC operation after AC power is restored after an AC power failure (e.g., see step 625 of FIG. 6), or after a maintenance operation (e.g., a battery test operation).

In some embodiments, the controller may delay the transfer from battery power operation to AC power operation to mitigate, for example, high peak (e.g., inrush) currents into the data center 105. A small fixed delay may further be provided to ensure that the AC input voltage is stable.

As described with reference to step 625 (FIG. 6), the method 700 may begin when the controller determines that the AC input power is restored. First, in step 710, the controller may determine a random delay parameter. For example, a random delay parameter may be stored in the NVM 310 that represents a length of time (e.g., time, clock cycles) to delay (e.g., 1 ms, 1 second, 100 seconds, etc.) before switching to AC powered operation.

In some embodiments, the random delay parameter may be randomly or pseudo-randomly determined. For example, the controller may generate a pseudo-random delay parameter using a seed (e.g., a serial number stored in a memory register on the UPS 115 and/or the motherboard 120, a machine time when the tray is first started-up, etc.) and a random number generator to generate the delay parameter. The delay parameter may then be used by the controller 245 and/or stored in the NVM 310. In another example, the delay parameter may be a random number (e.g., recorded from a physical process such as radioactive decay) that is stored in the NVM 310 during manufacturing process of the UPS 115.

In other embodiments, the delay parameter may be non-random, but based on a substantially unique value. For example, each delay time may be based on the serial number associated with the tray 110, the UPS 115, or another component of the system.

In one embodiment, the controller sets a timer to the random delay at step 715. In other embodiments, the controller may monitor the delay using a counter, a real time clock, an analog ramp or decay circuit with a threshold comparator, or other suitable delay device. Then, the controller determines, in step 720, whether $V_{BATT}$ is less than BATT_LOW. If $V_{BATT}$ is less than BATT_LOW, indicating that the battery is running out of charge, then the controller may switch from battery power to AC power in step 725 and the method 700 ends. For example, the controller may switch off battery power by opening the switch 530 in the circuit 500 (FIG. 5A). In the exemplary data center 105, it is unlikely that all the batteries will reach a discharge limit at the same time, so this method is not expected to substantially increase peak currents on the AC input voltage lines in most embodiments.

If $V_{BATT}$ is not less than BATT_LOW in step 720, then, in step 730, the controller checks whether the timer has expired. If the specified delay is not reached, then the step 720 is repeated. If the specified delay is reached, then the step 725 is executed and the method 700 ends.

In certain implementations, the system 100 can have multiple power sources including an AC power source, a battery, and a bootstrap circuit. The AC power source may be a primary power source that can power all or part of an electrical load, such as the DC loads 230 and the controller 245. The battery can serve as a secondary power source that backs up the primary power source in case of failure of the primary power source. The battery can also power all or part of the electrical load, and can be capable of powering substantially the same electrical load as the AC power source. The bootstrap circuit can power a portion of the electrical load. For example, if the electrical load includes the DC loads 230 and the controller, the bootstrap circuit can power the controller, but not the DC loads 230.

The bootstrap circuit may draw its power from a battery, such as battery 185, or a separate battery. In some implementations, the bootstrap circuit may be powered by a super-capacitor that is charged after the tray has been booted.

The method 700 can be used when the controller switches from battery operation to AC operation during an initial power-up, or boot, sequence of the trays 110. In some implementations, the bootstrap circuit can power the controller before the battery 185 is turned on. While powered by the bootstrap circuit, the controller can put the tray 110 in a battery mode that draws power from the battery 185 before an initial power-up of the tray. After the tray is powered by the battery, the controller can proceed with the method 700.

In other implementations, the controller is powered by the bootstrap circuit and switches to the AC operation without first switching to battery operation. For example, the bootstrap circuit can provide power to the controller, so that when the controller detects that AC power is present, the controller may initialize the method 700. In this example, the measurements and actions dependent upon the battery can be performed in relation to the bootstrap circuit. For instance, instead of $V_{BATT}$ being measured in step 720, a voltage output of the bootstrap circuit, $V_{BOOT}$ is measured. If $V_{BOOT}$ indicates that the bootstrap circuit does not have sufficient voltage to power the controller, the controller switches from the bootstrap circuit to the AC power (which is analogous to step 725) without waiting for the timer to expire.

In some implementations, the bootstrap circuit only provides power to the microcontroller after receiving a signal indicating the presence of AC power. In other implementations, the bootstrap circuit can provide power at a predetermined time. For example, the bootstrap circuit can provide power to the controller periodically (e.g., once per minute) so that the controller can check for the presence of AC power. In another example, the bootstrap circuit may provide power to the controller at a particular time, such as a scheduled start-up time for the trays.

In some implementations, the controller can monitor additional signals (as well as the signal indicating AC presence) to determine when to start a counter programmed with the delay parameter. For example, a "start" signal can be combined with the AC presence signal in a logical AND operation. If AC is present and the start signal is asserted, then the counter is started. Otherwise, the counter is not started.

In various embodiments, the battery voltage may be above and/or below the regulated voltage on the DC bus. In some embodiments, the AC-to-DC converter may regulate to a set point voltage that is within 50, 100, 200, 250, 400, 500, . . . , 1000 mV of the battery's nominal fully charged voltage. In various implementations, the regulation set point may be dynamically determined, for example, based on battery characteristics, such as the age, usage history, temperature, internal resistance, charge time response, discharge time response, or other battery circuit-related characteristics. If the battery voltage is above the set-point voltage, then the charger may include a step-up and/or buck-boost type converter circuit.

In some embodiments, a tray 110 may be a modular support structure configured to be mounted in one of a number of locations, slots, or positions in the rack 125. Each tray 110 may include a substrate, such as a printed circuit board (PCB), on which the UPS 175 and the motherboard 120 and/or other DC loads 230 may be integrated. The trays 110 may provide features for a thermal management system, including ports for air flow, when installed in one of the racks 125. The term "tray" is not intended to refer to a particular arrangement, but instead refers to any arrangement of computer-related components coupled together to serve a particular purpose, such as on a motherboard. Trays may be generally mounted parallel to other trays in a horizontal or vertical stack, so as to permit denser packing than would otherwise be possible with computers having free-standing housings and other components. The term "blade" may also be employed to refer to such apparatuses. Trays may be implemented in particular configurations, including as computer servers, switches (e.g., electrical and optical), routers, drives or groups of drives, and other computing-related devices.

Embodiments of the UPS 115 may be configured to accept various primary or secondary battery technologies. Technologies may include, but are not limited to super-capacitors, sealed lead acid, nickel metal hydride, nickel cadmium, spiral wound lead acid, alkaline, and lithium ion. The UPS 115 may include circuitry to auto-detect battery chemistry, and adapt charging and discharge profile information according to the determined battery characteristics. In some embodiments, the set point to which the AC-to-DC converter 170 regulates the DC bus 175 may be responsive to the auto-detected battery characteristics. In various embodiments, the battery voltage may be between about 8 Volts and about 26 Volts, such as about 9, 10, 11, 12, 13, . . . , 23, 24, or 30 Volts.

For example, a nominal 12 Volt lead acid battery may have a corresponding set point regulation on the DC bus of about 13.65 Volts, for example, to provide for substantially fully charging the battery. In the event of a switchover from 13.65 Volts regulation on the DC bus to battery voltage, the transient step (in this case, a drop) in voltage on the input to the DC load will be relatively small, such as less than 1 Volt, for example. Such a small change in the input voltage may substantially mitigate adverse transients in the DC loads.

The battery 185 may be a single cell, or a combination of cells arranged in series and/or parallel. In some embodiments, one or more batteries in a UPS may be hot swappable in modes other than battery back-up mode in which the battery is discharging into the load during a fault condition on the AC bus 225. A visual or audible indicator may be provided to alert service personnel whether the battery may be hot swapped.

When mounted on a tray 10, a battery may be located and supported for quick and convenient replacement. Various quick connect/quick disconnect wire harnesses (e.g., Fast-on style connectors), spring-biased electrical contacts, snap features, locking tabs, or the like may be employed to retain batteries for secure connection and quick replacement.

AC mains voltage, as used herein, may refer to AC voltage sources that typically have a fundamental frequency between about 47 Hz and about 500 Hz, without being necessarily so limited. Sources of AC voltage may be derived from stationary or mobile sources, examples of which may include rotating electric generators on transport vehicles, trucks, trains, ships, aircraft, or the like. Rotating generators refer to sources of electric power that substantially derive from coupling a time-varying magnetic field to one or more conductors to produce a substantially sinusoidal voltage. In some implementations, a magnetic field is rotated relative to one or more conductive windings. In some other implementations, one or more conductive windings are rotated relative to a stationary magnetic field.

The AC-to-DC converter 170, in one implementation, being the only AC-to-DC rectification in the power path from the AC generator to the DC load 230, may include features to reduce harmonic distortion, mitigate conducted emissions, manage inrush current, and the like. Accordingly, the converter 170 may incorporate hardware, software, or a combination thereof, to provide power factor correction, spread spectrum (e.g., frequency hopping) switching frequency, filtering, and/or current controlled start-up, for example.

Regulation of the DC bus voltage output by the converter 170 may be accomplished by employing any suitable switching converter and control strategy for providing the single output voltage at a determined set point. Switching topologies may include, but are not limited to, forward, flyback, Cuk, SEPIC, buck, buck-boost, or any suitable resonant or quasiresonant AC-to-DC converter. In one illustrative embodiment, the AC-to-DC rectification and conversion is accomplished, at least in part, with appropriate operation of an active switching matrix having four controllable switches that modulate the AC input voltage applied to an inductive element in a buck arrangement. In another illustrative embodiment, the AC input voltage is rectified by an uncontrolled diode rectifier stage, followed by a magnetically coupled DC-to-DC conversion stage using a forward or flyback topology, for example. In yet another illustrative example, a power factor input stage is followed by one or more cascaded step-down DC-to-DC converter stages to yield the regulated voltage at the determined set point. Linear regulation may be used in combination with switch-mode power conversion. From this disclosure, one of ordinary skill in the art will recognize a number of implementations for the AC-to-DC converter 170.

With reference for example to FIG. 4 as an illustrative example, some embodiments of the system 400 may operate in any of at least four modes. In a first mode, the processing unit 405 is shut down, as is the UPS 115. In a second mode, the battery 185 is charged using power received from the DC bus 175. In this second mode, the battery 185 may fast charge or trickle charge according to a charging algorithm. In a third mode, the battery is "floated" being effectively disconnected from the DC bus and neither charging nor discharging while the AC-to-DC converter supplies operating power to the DC load 230. In a fourth mode, the battery is operatively connected to the DC bus 175, and discharges to supply operating power to the DC loads 230. This fourth condition may be initiated in response to a fault condition on the AC bus 225.

In various implementations, transfers between voltage sources may involve certain transition sequences. The AC switchgear 220 (FIG. 2), for example, may transfer between any of the generators 205, 210, 215 using either a substantially make-before-break or a substantially break-before-make transfer sequence. When switching from AC input operation to battery operation, the UPS 115 may, in some embodiments, disable operation of the AC-to-DC converter before, substantially during, or after the battery 185 is connected across the DC bus 175. If all the converter 175 output current passes through a series diode, for example, then the converter 175 may be disabled by simply disabling operation of the DC-to-DC switching at the switch-mode controller (not shown). In other embodiments, the output may be actively disconnected by a semiconductor switch, for example.

A number of embodiments of the invention have been described. Nevertheless, it will be understood that various modifications may be made without departing from the spirit and scope of the invention. For example, both the back-up battery and the power supply unit can be located off the tray 110. Also, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer implemented method for powering a system, the method comprising steps executed by one or more controllers including:

receiving, at a central controller communicably coupled to one or more secondary controllers, power status information about a plurality of computing devices in a group of computing devices associated with a particular secondary controller;

receiving a signal that indicates availability of a primary power source to supply operating power to the plurality of computing devices in the group of computing devices; and responsive to the received signal, transitioning each of the plurality of computing devices from a secondary power source to receiving power from the primary power source after a delay time that is a function of a substantially unique seed value for each computing device has passed, wherein a particular computing device is transitioned from the secondary power source to receiving power from the primary power source independently of each other computing device in the group of computing devices after the delay time that corresponds to the particular computing device has passed.

2. The method of claim 1, wherein the computing device is selected from a group consisting of a controller, a power supply, and a server.

3. The method of claim 1, further comprising determining the seed value for each computing device based upon a substantially unique serial number for that computing device.

4. The method of claim 1, wherein the seed value is stored in a memory accessible to the computing device.

5. The method of claim 4, further comprising storing the seed value during manufacture or during deployment of the computing device.

6. The method of claim 4, further comprising inputting the seed value for storage using software.

7. The method of claim 6, wherein the seed value is input over a network.

8. The method of claim 1, further comprising adjusting the delay time based upon a measured peak inrush current value associated with the primary power source.

9. The method of claim 8, wherein the adjusting comprises supplying a weighting factor for the function used to determine the delay time, the weighting factor being based on the measured peak inrush current value.

10. The method of claim 1, wherein the primary power source comprises an AC power source.

11. The method of claim 1, wherein the secondary power source comprises a battery.

12. The method of claim 11, wherein the battery is a back-up power source used to power the computing device in the absence of the primary power source.

13. The method of claim 1, wherein the secondary power source comprises a bootstrap circuit.

14. The method of claim 13, wherein the bootstrap circuit is powered by a battery.

15. The method of claim 13, wherein the bootstrap circuit is powered by a super-capacitor.

16. The method of claim 13, wherein the bootstrap circuit powers a portion of the computing device.

17. The method of claim 1, wherein the secondary power source comprises a super-capacitor.

18. The method of claim 1, further comprising switching from the primary power source to the secondary power source after detecting the primary power source is absent, unstable, or insufficient.

19. The method of claim 1, wherein the delay time is determined by seeding a random value generator with the seed value.

20. The method of claim 1, wherein the received signal is associated with a booting of the computing device.

21. The method of claim 1, wherein the delay time is determined using the seed value as an input to a modulus function.

22. The method of claim 1, further comprising adjusting the delay time based on an output of the secondary power source.

23. The method of claim 22, wherein the adjustment comprises substantially eliminating the delay time if the output of the secondary power source crosses a threshold indicating a low power condition.

24. The method of claim 1, wherein the delay time sets a timer used to determine when a computing device transitions from the secondary power source to receiving power from the primary power source.

25. The method of claim 1, further comprising receiving a second signal and transitioning the plurality of computing devices if both the second signal and the signal that indicates availability of a primary power source are received.

26. A system comprising:
 a central controller in communication with one or more secondary controllers, wherein the central controller is operable to receive power status information about a plurality of computing devices in a group of computing devices associated with a particular secondary controller;
 an interface for receiving a signal that indicates availability of a primary power source to supply operating power to the plurality of computing devices in the group of computing devices;
 a data store to store a delay time that is a function of a substantially unique seed value for each computing device in the plurality of computing devices; and
 means for transitioning a particular computing device in the group of computing devices to receiving power from a secondary power source to receiving power from the primary power source independently of every other computing device in the group of computing devices after the stored delay time that corresponds to the particular computing device has terminated, wherein the transitioning is initiated in response to the received signal.

27. A computer implemented method for powering a system, the method comprising steps executed by one or more controllers including:
 receiving a signal that indicates availability of a primary power source to supply operating power to a plurality of computing devices;
 responsive to the received signal, transitioning each of the plurality of computing devices from a secondary power source to receiving power from the primary power source after a delay time that is a function of a substantially unique seed value for each computing device has passed; and
 adjusting the delay time based upon a measured peak inrush current value associated with the primary power source,
 wherein the adjusting comprises supplying a weighting factor for the function used to determine the delay time, the weighting factor being based on the measured peak inrush current value.

28. The method of claim 27, further comprising determining the seed value for each computing device based upon a substantially unique serial number for that computing device.

29. The method of claim 27, wherein the delay time sets a timer used to determine when a computing device transitions from the secondary power source to receiving power from the primary power source.

30. A computer implemented method for powering a system, the method comprising steps executed by one or more controllers including:
 receiving a signal that indicates availability of a primary power source to supply operating power to a plurality of computing devices;
 responsive to the received signal, transitioning each of the plurality of computing devices from a secondary power source to receiving power from the primary power source after a delay time that is a function of a substantially unique seed value for each computing device has passed; and
 adjusting the delay time based on an output of the secondary power source,
 wherein the adjustment comprises substantially eliminating the delay time if the output of the secondary power source crosses a threshold indicating a low power condition.

31. The method of claim 30, further comprising receiving a second signal and transitioning the plurality of computing devices if both the second signal and the signal that indicates availability of a primary power source are received.

* * * * *